H. B. AND F. E. HARTMAN.
METHOD OF DRYING OR SETTING PAINTS, VARNISHES, ENAMELS, OR THE LIKE.
APPLICATION FILED AUG. 10, 1920.
1,395,569.
Patented Nov. 1, 1921.
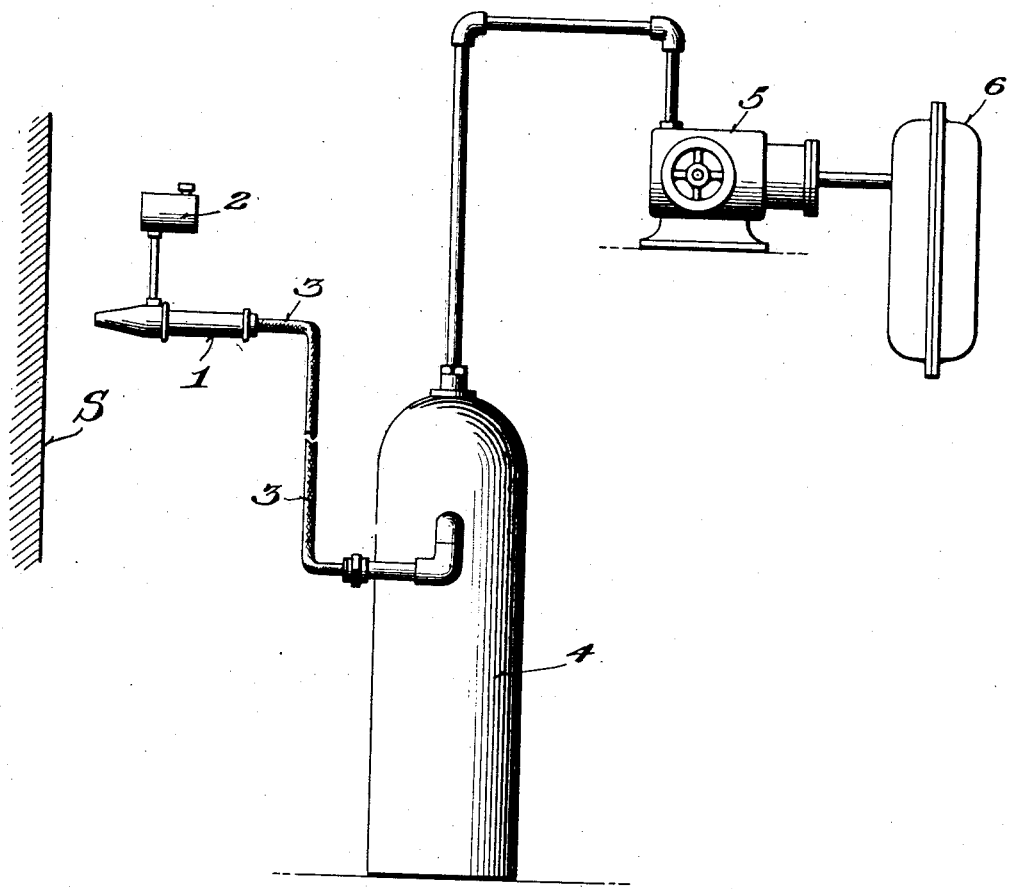

UNITED STATES PATENT OFFICE.

HARRY BUXTON HARTMAN AND FRANK EDWARD HARTMAN, OF SCOTTDALE, PENNSYLVANIA, ASSIGNORS TO ELECTRIC WATER STERILIZER AND OZONE COMPANY, A CORPORATION OF PENNSYLVANIA.

METHOD OF DRYING OR SETTING PAINTS, VARNISHES, ENAMELS, OR THE LIKE.

1,395,569.   Specification of Letters Patent.   Patented Nov. 1, 1921.

Application filed August 10, 1920. Serial No. 402,635.

*To all whom it may concern:*

Be it known that we, HARRY B. HARTMAN and FRANK E. HARTMAN, citizens of the United States, residing at Scottdale, in the county of Westmoreland and State of Pennsylvania, have invented certain new and useful Improvements in Methods of Drying or Setting Paints, Varnishes, Enamels, or the like, of which the following is a specification.

This invention relates to coating processes, and has for its primary object the oxidation of the vehicle simultaneously with the application of the coating on the surface to be covered.

That is to say, the present invention contemplates a process wherein the volatile constituent of the coating composition is subjected to intimate contact with an artificial oxidizing agent, namely ozone, simultaneously with the operation which involves the application of the coating. It is a well known fact that owing to the comparatively wide range in the volatile characteristic of enamels, paints and the like, some paints dry quicker than others, and in order to obtain the advantages of a slow drying vehicle and yet reduce the time element required for this purpose, the present invention proposes to intimately mix ozone with the coating composition at the time of application in the form of a finely divided spray, produced by forcing the paint material through a nozzle device by means of ozone under pressure.

In carrying the present process into effect any suitable and convenient type of apparatus may be employed, but by way of illustration one form of apparatus is shown diagrammatically in the accompanying drawing, in which:

The figure is a diagram indicating a form of apparatus which may be used.

The present method, as previously indicated proposes to subject the coating composition to an oxidizing agent at the time of application as distinguished from bringing the constituents of the material into contact with such an agent prior to mixing, and as also distinguished from subjecting the materials after application to the surface to be coated to an atmosphere containing a large quantity of ozone. Accordingly, by reference to the accompanying drawing it will be observed that it is proposed to bring the coating material into intimate contact with the oxidizing agent ozone in the discharge orifice of a nozzle 1, which may be of the atomizing or other type. That is to say, it is proposed to utilize a spraying nozzle connected with a source of paint supply 2 and also by means of a connection 3 with a storage tank 4 of ozonized air, the same being supplied with ozone and air by a compressor 5 which is connected with an ozone generator 6. The said compressor 5 pumps ozone from the generator 6 and air into the storage tank 4.

In order to apply the coating to the surface S for instance, the ozone and air under pressure is permitted to escape from the discharge orifice of the nozzle 1 to thereby draw the coating material also through the nozzle and produce a finely divided spray of the paint mixture, whereby the minute globules of paint will be intimately and forcibly brought into contact with the ozonized air, at the time of application.

It will of course be understood that any type of atomizing or equivalent nozzle may be employed which may be found suitable to the requirements of application, and it will also be apparent that the amount of ozone or other oxidizing agent utilized in forming the spray may be varied according to the volatile properties of the vehicle.

The oxidation of the vehicle, started by subjecting the coating material to the ozone in forming the spray, accordingly accelerates the drying or setting of the coating and thus reduces the time element required for the natural elements of the atmosphere to effect the drying operation.

We claim:

1. A method of drying or setting paints, varnishes, enamels or the like which consists in subjecting the paint composition to the action of ozone simultaneously with the application thereof.

2. A method of drying or setting paints, varnishes, enamels or the like which consists in forming a spray of the coating material by an injection of ozone.

3. A method of drying or setting paints, varnishes, enamels or the like which consists in utilizing a mixture of compressed air and ozone to form a finely divided spray of the coating material on the surface to be coated.

4. A method of drying or setting paints, varnishes, enamels or the like which consists in forming a finely divided spray of paint material and ozone to start oxidation at the time of application.

In testimony whereof we hereunto affix our signatures in the presence of two witnesses.

HARRY BUXTON HARTMAN.
FRANK EDWARD HARTMAN.

Witnesses:
ETTA LYDIA KING,
FREDERICK L. BROWN.